Dec. 3, 1968 R. M. FACHINI 3,413,785
COTTON PICKER
Filed March 24, 1966 2 Sheets-Sheet 1

Inventor:
Robert M. Fachini
John J. Kowalik
Atty.

Dec. 3, 1968  R. M. FACHINI  3,413,785
COTTON PICKER
Filed March 24, 1966  2 Sheets-Sheet 2
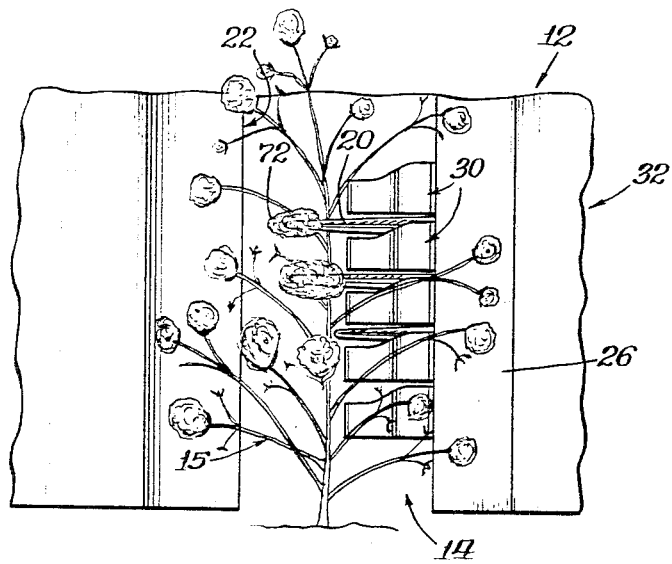
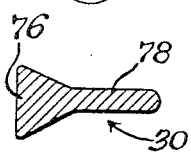
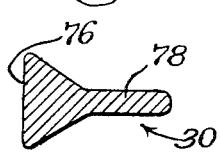
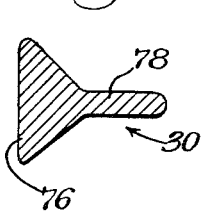
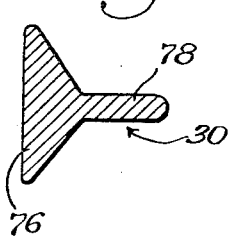
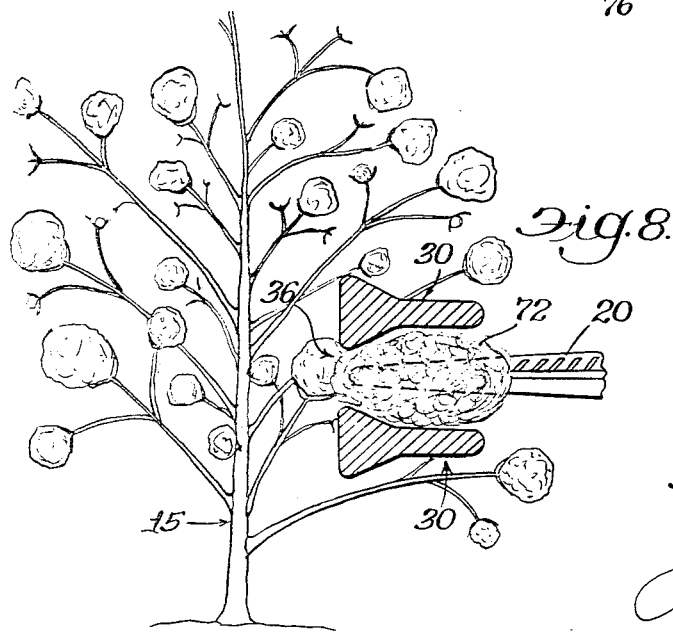
Inventor:
Robert M. Fachini
John J. Torralik
Atty.

United States Patent Office 3,413,785
Patented Dec. 3, 1968

3,413,785
COTTON PICKER
Robert M. Fachini, 5588 Melvin Road,
Memphis, Tenn. 38117
Filed Mar. 24, 1966, Ser. No. 537,064
2 Claims. (Cl. 56—43)

The present invention relates to a cotton picker.

The invention relates to that kind of cotton picker having picker units with fore-and-aft passages therethrough, and as the picker moves along the rows of cotton, the cotton plants pass through the passages, and spindles work into and out of the passages through slots provided therefor. The plants are considerably compressed and compacted in the passages and tend to work through the slots provided for the spindles.

A broad object of the invention is to provide a novel construction for use in a cotton picker of the foregoing character highly effective for preventing the working of the cotton plants through the slots referred to.

A more specific object is to provide a construction in which the slots referred to are dimensionally proportioned to the spindles and the cotton held thereon, relative to the projection of the spindles into the passage and the withdrawal of the spindles with cotton thereon from the passages.

A still more specific object is to provide a novel construction in a cotton picker of the foregoing general character in which the slots referred to increase in width from front to rear for respectively accommodating the naked spindles in the narrow part of the slots, and accomodating the spindles loaded with cotton in the wide portion of the slots.

Other objects and adavntages of the invention will appear from the following detail description taken in conjunction with the accompanying drawings:

FIGURE 3 is a fragmentary front view taken at line 3—3 of FIGURE 1;

FIGURE 4 is a sectional view taken at line 4—4 of FIGURE 2;

FIGURE 5 is a sectional view taken at line 5—5 of FIGURE 2;

FIGURE 6 is a sectional view taken at line 6—6 of FIGURE 2;

FIGURE 7 is a sectional view taken at line 7—7 of FIGURE 2; and

FIGURE 8 is a view taken at line 8—8 of FIGURE 1.

Figure 1:
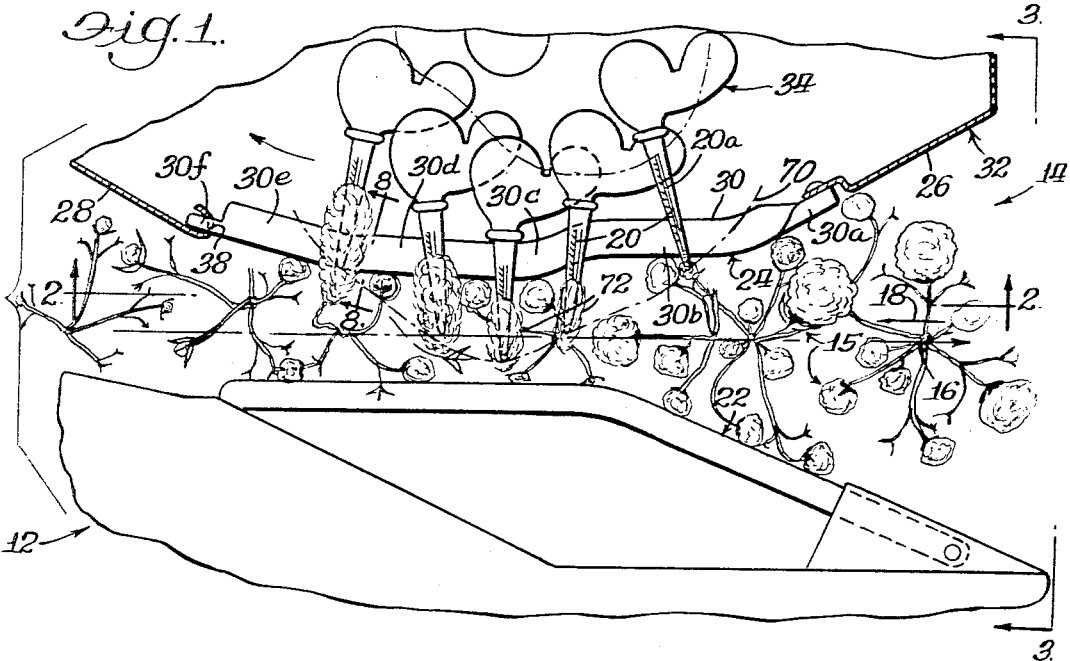
FIGURE 1 is a horizontal sectional view of a portion of a picker unit.
Figure 2:
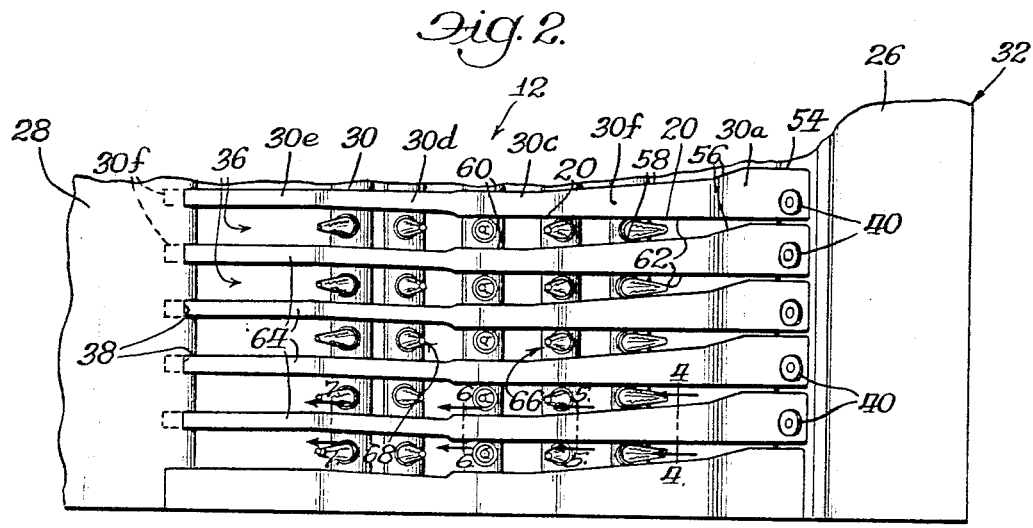
FIGURE 2 is a view taken at line 2—2 of FIGURE 1, being a face view of a portion of the side wall of the plant receiving passage showing the novel slot arrangement of the invention.

Referring now in detail to the drawings attention is directed first to FIGURE 1 which is a horizontal sectional view of a portion of a picker unit. The picker unit indicated in its entirety at 12, in general may be of suitable and known kind, except as described in detail hereinbelow. As will be understood the cotton picker is provided with a plurality of such units, usually a pair thereof. Each unit is provided with a plant receiving passage 14 through which the cotton plants 15 to be picked pass, the direction of progress of the picker in the picking operation being indicated by the arrow 16, and the cotton plants pass through the passage in the opposite direction, relatively speaking, i.e., from front to rear as indicated by the arrow 18. A plurality of spindles 20 are provided, to be referred to again hereinbelow, these spindles projecting into and retracting from the passage 14 for picking the cotton from the plants therein, the spindles moving from front to rear of the passage, relative to the construction of the picker, but being relatively stationary to, and following, the passage of the cotton plants therethrough, in a known manner.

The passage 16 is defined by side walls 22 and 24, the side wall 22 being also referred to as a compressor plate and preferably having a smooth, solid and unbroken surface which may be undulated for certain crop conditions. The spindles 20 in projecting into the passage closely approach the compressor plate 22 in their farthest extent of projection as seen from FIGURE 1.

The side wall 24 is made up partially of a plate or post 26 at the leading end of the passage, another plate or post 28 at the trailing end of the passage and a plurality of slat bars 30 constituting the principal feature of the invention. The posts 26 and 28 are elements of a housing 32 of the picker unit 12. The housing encloses the spindles 20, except when they are in picking position in the passage 14, and other operating components in the picker unit. It will be understood by those skilled in the art that the spindles 20 are incorporated in a drum 34 rotating on a vertical axis. The spindles are disposed in a plurality of vertical rows spaced circumferentially around the drum. Upon rotation of the drum the spindles project through the slots 36 (FIGURE 3) between the slat bars and into the passage 14 and after picking the bolls from the cotton plants they are withdrawn again through the slots and carried to the opposite side to the unit where the cotton is removed from the spindle by doffer means and carried to a receptacle in the picker by an air stream. Another drum 34 with spindles is provided rearwardly of that shown and on the opposite side of the passage 14, in accordance with usual construction. These various components are known and need not be described herein.

The slat bars 30 as viewed in plan (FIGURE 1) have a characteristic shape, designed for compressing and compacting the plants in the passage 14. The slat bars are all identical, and each has a leading end 30a forming a continuation of the plate element 26, a second portion or section 30b extending generally in the direction of the passage 14, a third portion or section 30c which bows outwardly toward the opposite side wall of the passage, followed by a fourth portion or section 30d which slopes inwardly slightly from the bowed portion 30c and a final portion 30e which is inclined inwardly at an angle from the portion 30d. The last or trailing portion 30e closely approaches the direction of the plate 28 at the trailing end of the passage. The slat bars are mounted in place in a known manner as by inserting the end element 30f in a notch 38 in the plate 28 and securing the other end 30a by suitable means such as screws 40 preferably countersunk in the slat bars to present a smooth outer surface of the salt bars to the passage 14.

The slat bars 30 also have a characteristic shape as viewed from the face thereof as shown in FIGURE 3. The slat bars decrease in width, i.e., vertical dimension, in progressing from the leading end to the trailing end whereby to provide slots which increase in width, or vertical dimension, progressing in the same direction. The leading end portion 30a has a top edge 54, extending substantially parallel with the direction of the slat bar, followed by a relatively sharply inclined edge 56 which in turn is followed by an edge 58, inclined but at an inclination less than the edge 56. The edge 58 is then followed by an edge 60 which again is substantially parallel with the direction of the slat bar. Coinciding with the edges just referred to is a bottom edge 62 also extending substantially in the direction of the slat bar. Beyond the edges just referred to is an abruptly reduced segment 64 extending nearly, if not exactly, in the direction of the slat bar. These various elements of the slat bars together thus provide two main segments of the slots 36, namely, the first or leading segment 66 and a second or trailing segment 68. The leading segment 66 of the slot gradually increases from front to rear although not uniformly, increasing according to the changes in direction in the edge elements 56, 58 and 60.

The exact shapes of the portions 66 and 68 of the slots is predetermined according to the movement of the spindles therethrough together with the shape of the slat bars as viewed in plan, as will be referred to again hereinbelow. The principal consideration is that the spindles, both bare and with cotton thereon, substantially "fill" the slots at all times so as to prevent the cotton plants from working through the slots, and prevent the cotton bolls also from working through the slots, except as drawn therethrough by the spindles. The spindles follow a characteristic pattern of movement in moving through the slots, as is known, the outer extremities thereof following a path indicated by the line 70. The spindles follow a combination of linear movement along their own axes, and a sideways movement, and this movement determines the shape of the slots. For example, in the initial portion of the movement of the spindle entering the slot, as represented by the spindle 20a only the outermost pointed end of the spindle is in or projects through the slot. The leading end 30a of the slat bars is relatively inclined to the direction of movement of the picker and thus the rate of projection of the spindle through the corresponding part of the slot is great, and hence the relatively great inclination of the edge element 56. Following this portion and because the segment 30b of the slat bar is relatively parallel with the direction of movement of the picker, the slot need not increase in width so rapidly, and hence the less increase in width of the slot as determined by the edge element 58. As the spindle approaches the bowed portion 30c of the slat bar it is nearly fully projected through the slot, and hence the slot at this location may be substantially uniform in width, as determined by the edge element 60. At all the locations along the slot segment 66 as just described, the width of the slot is substantially only sufficient to receive the spindles, with of course a reasonable amount of clearance for practical considerations. The slots may be considered as having a leading end or spindle tip entry zone; an intermediate zone or spindle base accommodating zone or picking zone; and a trailing end or cotton-laden spindle withdrawal zone or exit zone.

As the spindles project through the slots they begin to accumulate cotton as indicated at 72, the amount of cotton increasing to a relatively great quantity and this quantity is of course withdrawn through the slots and is accommodated by the relatively great width of the slot segment 68 enabling the cotton to be withdrawn therethrough. The segment 68 begins at the point where the spindles begin their withdrawing or retracting action. The spindles in this portion of their movement are disposed at a negative angle, as is known, for the purpose of facilitating withdrawing of the spindles from the cotton plants, but in a later portion of their movement they follow also a sideways action, sweeping through the segment 68 of the slots throughout substantially the length thereof. In this movement the quantities of cotton on the spindles are nearly in side by side contact engagement, or with only small space therebetween.

The length of the slat bars, and the slots, is preferably such as to only accommodate the movement of the spindles, eliminating formerly unused portions of the slots at the ends thereof. Thus the spindles throughout their travel through the slots substantially "fill" the slots, i.e., extend the vertical dimension of the slots. In the projection of the spindles through the slots, only the bare spindles need be accommodated, while in the withdrawing movement, the wider segments of the slots accommodate the large quantities of cotton.

The compacting and compressing action on the cotton plants in the passage 14 is substantial, for the purpose of confining the plants within the transverse dimension according to the length of the spindles, as is known, and this action tends to force the plants, or portions of them, through the slots. The spindles serve to prevent this action due to the fact that they fill the slots at the narrow end and tend to push the plants away from the slats. As these spindles penetrate into the spaces between the branches of the plants the increase in size of the spindles continues the pushing action until the spindles are substantially loaded and when they are then withdrawn from the plants through the slots, they again fill the slots and actually cover the slots due to their combined withdrawing and sideways movement and again prevent the plants, or branches thereof, from being forced through the slots. FIGURE 8 represents this action of the cotton filling the slots.

The slat bars 30 may be made in any suitable manner, such as by casting them from aluminum. FIGURES 4 to 7 are sectional views of a slat bar at different locations thereon. The slat bar may for example be T-shape in cross section having a flange 76 for determining the slot edge and a web 78 for strengthening purposes.

While I have disclosed herein a preferred form of the invention it will be understood that changes may be made therein within the spirit and scope of the appended claims.

I claim:

1. In a cotton picker having a picking unit with a fore-and-aft passage therein for the movement of cotton plants therethrough pursuant to movement of the picker along the plants, and having spindles projectable through slots into said passage and into cotton plants in the passage and movable along the passage with the cotton plants and thereupon being retractable from the passage, the invention comprising means forming a space for accommodating the spindle for movement into and out of the passage and confining the spindles to a space equivalent to bare spindles in the movement of the spindles into the passage and then providing greater space for accommodating cotton the spindles in the withdrawing action of the spindles, wherein the passage is defined by opposed wall elements, and one of the wall elements defines slots through which the spindles move into and out of the passage, said slots increasing in width in direction of the movement of the spindles through the passage, and being formed by a plurality of individually mounted slat bars, the slat bars having respectively opposed edges defining the slots, and the slots having a leading portion generally increasing in width progressing to the rear, and the slat bars at their leading portions each having one straight edge extending generally in the direction of the movement of the picker and another edge having elements inclined to that direction for forming said increasing dimensions of the said portions of the slots.

2. The invention set out in claim 1 wherein the slat bars, as viewed in plan, have a predetermined shape, and the spindles follow a predetermined pattern of movement through the slots, and wherein said second edge of the slat bars is made up of a succession of edges accommodating the movement of the bare spindles therethrough whereby to provide a space for the spindles in vertical direction substantially equivalent to the diameter of the spindles at all points of the spindles in register with the edges defining the slot throughout the movement of the spindles through the slots.

References Cited

UNITED STATES PATENTS

| | | | |
|---|---|---|---|
| 542,794 | 7/1895 | Campbell | 56—43 |
| 768,400 | 8/1904 | Piper | 56—43 |
| 1,802,022 | 4/1931 | Johnston et al. | 56—14 |

RUSSELL R. KINSEY, *Primary Examiner.*